United States Patent [19]

Otsuki et al.

[11] 4,085,263

[45] Apr. 18, 1978

[54] PROCESS FOR ISOMERIZATION OF LOWER POLYMERS OF BUTADIENE

[75] Inventors: Yutaka Otsuki; Hirosuke Imai, both of Yokohama; Atsushi Kaiya, Kawasaki; Hideo Horji, Yokohama, all of Japan

[73] Assignee: Nippon Oil Company, Limited, Tokyo, Japan

[21] Appl. No.: 577,930

[22] Filed: May 15, 1975

Related U.S. Application Data

[63] Continuation of Ser. No. 391,204, Aug. 24, 1973, abandoned.

[30] Foreign Application Priority Data

Aug. 25, 1972 Japan .................................. 47-85076
Sep. 28, 1972 Japan .................................. 47-96613

[51] Int. Cl.$^2$ ........................... C08F 8/42; C08F 8/32
[52] U.S. Cl. ................................. 526/47; 260/680 B
[58] Field of Search ............... 260/94.7 N, 94.6, 85.1, 260/680 B; 526/47

[56] References Cited

U.S. PATENT DOCUMENTS

| 3,278,441 | 10/1966 | Manuel et al. ............. 260/94.7 R X |
| 3,492,369 | 1/1970 | Naylor ................................. 260/879 |
| 3,647,803 | 3/1972 | Schlott et al. .................. 260/94.6 X |
| 3,751,384 | 8/1973 | Langer ........................... 260/94.6 X |
| 3,931,126 | 1/1976 | Naylor .................................. 526/47 |
| 3,976,628 | 8/1976 | Halasa et al. ......................... 526/47 |

*Primary Examiner*—William F. Hamrock
*Attorney, Agent, or Firm*—Flynn & Frishauf

[57] ABSTRACT

When a lower polymer of butadiene or a lower copolymer of butadiene with a conjugated diolefin other than butadiene or a vinyl-substituted aromatic comonomer is reacted at 0° to 200° C. in the presence of a combination catalyst including an organic alkali metal compound and a specific diamino compound, the non-conjugated double bonds are effectively isomerized to the conjugated diene double bonds at a very high conversion, and a polymer having a high reactivity, which is useful as a paint vehicle, a thermosetting material, an adhesive, a rubber compounding material and an intermediate for various synthetic reactions, can be obtained.

13 Claims, No Drawings

PROCESS FOR ISOMERIZATION OF LOWER POLYMERS OF BUTADIENE

This is a continuation of application Ser. No. 391,204, filed Aug. 24, 1973, now abandoned.

BACKGROUND OF THE INVENTION

1. Field of the Invention

This invention relates to a process for isomerization of lower-polymers of butadiene which comprises treating a lower polymer of butadiene or a lower copolymer of butadiene with a combination catalyst comprising an organic alkali metal compound and a diamine compound to thereby isomerize a non-conjugated double bond in the polymer to a conjugated double bond.

And further, it relates to a process for producing an isomerized butadiene lower polymer having conjugated double bonds which comprises performing a lower polymerization and copolymerization of butadiene with an organic alkali metal catalyst or alkali metal, followed by a further reaction with an addition of a diamine compound to the reaction mixture in situ to isomerize their non-conjugated double bond to the conjugated double bond.

2. Description of the Prior Art

It is known that a lower polymer or copolymer of butadiene can be prepared by polymerizing butadiene or copolymerizing it with another monomer in the presence of a catalyst comprising an alkali metal catalyst, an organic alkali metal catalyst or a combination catalyst comprising a compound of a metal belonging to Group VIII of the periodic Table and an alkyl aluminum halogenide.

And there are also many published reports with regard to the production of lower polymers of butadiene and copolymers of butadiene with conjugated diolefines or vinyl-substituted aromatic compounds using organic alkali metals or alkali metal dispersions as a component of the catalyst. Some of the typical catalysts used in the production are, for example, a metallic sodium dispersion-naphthalene complex (Japanese patent publication No. 7051/65, 27432/68), a metallic sodium-ether complex and an organolithium compound (Japanese patent publication No. 26477/66, U.S. Pat. Nos. 2,913,444, 3,097,108, 3,105,828, 3,119,800 and 3,140,278; a living polymerization in tetrahydrofuran solvent). And a chain transfer polymerization process (Japanese patent publication No. 7446/57), which comprises employing aromatic hydrocarbons such as toluene or xylene as a chain transfer agent with the addition of dioxane and isopropyl alcohol, etc. to metallic sodium dispersions.

Since a lower polymer or copolymer of butadiene obtained by such known method has a large amount of 1,2-double bonds and 1,4-double bonds in the molecule and has a relatively high reactivity, the polymer is used in various fields as a paint vehicle, thermosetting resin, adhesive, rubber compounding material, intermediate material for various synthetic reactions and prepolymer. However, since the double bonds of such lower polymer of butadiene are non-conjugated ones, it is still insufficient with respect to the reactivity as compared with compounds containing conjugated double bonds in the molecule such as tung oil and dehydrated castor oil. Accordingly, it is expected that if non-conjugated double bonds of the butadiene units contained in a lower polymer or copolymer of butadiene can be isomerized to conjugated double bonds by an economically advantageous method to thereby improve the reactivity of the lower polymer of butadiene, its application fields will be further expanded.

As an instance of such isomerization method, there is known a method comprising reacting a lower polymer of butadiene at 110° to 250° C. in the presence of a catalyst comprising a compound of a transition metal belonging to Group VIII of the Periodic Table (Japanese patent publication No. 5757/68). This method, however, is defective in that the reaction should be conducted at high temperatures and such undesired phenomena as gelation and coloration of the polymer are readily caused to occur. Further, the catalyst comprising a compound of a transition metal belonging to Group VIII of the Periodic Table is expensive, and therefore, this method is disadvantageous from the economical viewpoint.

A method comprising subjecting a lower polymer of butadiene to air oxidation in the presence of cobalt naphthenate catalyst to thereby improve the reactivity of the lower polymer is also known in the art (Japanese patent publication Nos. 4592/58 and 3865/71).

Moreover, in order to commercialize these butadiene lower polymers and copolymers, it will be required that they are isomerized further in their separate ways, and this will result in the increase of production costs. However, according to this method, the amount of the conjugated diene formed by the reaction is very small, and coloration or degradation is readily caused to occur.

SUMMARY OF THE INVENTION

We have made various investigations with a view to developing a method for improving the reactivity of a lower polymer or copolymer of butadiene, and as a result, we have found that when a combination catalyst comprising a specific organic alkali metal compound and a specific diamine compound is employed, non-conjugated double bonds of the butadiene units of such lower polymer can be isomerized to conjugated double bonds at a very high conversion at a low reaction temperature without occurrence of coloration of gelation. Based on this finding, we have now completed this invention.

And further, it has also been found that when the polymerization of butadiene and copolymerization of butadiene with other monomers are carried out by using organic alkali metals or alkali metal dispersions as a catalyst, followed by a further processing under prescribed reaction conditions of the polymerization reaction mixture with the addition of certain diamine compounds, isomerized butadiene polymers can be obtained without disadvantages such as coloring and gelling.

More specifically, in accordance with this invention, there is provided a process for the isomerization of lower polymers of butadiene and lower copolymers of butadiene with at least one monomer selected from the group consisting of conjugated diolefins other than butadiene and vinyl-substituted aromatic compounds, which comprises reacting such low polynmer at 0° to 200° C. in the presence of a catalyst comprising an organic alkali metal compound and a diamine compound represented by the following general formula

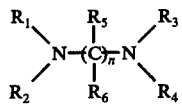

wherein n is an integer of 2 or 3, and $R_1$, $R_2$, $R_3$, $R_4$, $R_5$ and $R_6$ stand for a hydrogen atom or an organic compound residual group having 1 to 20 carbon atoms and optionally two members of $R_1$, $R_2$, $R_3$ and $R_4$ may be bonded together to form a cyclic structure. Alternatively, according to this invention, there is provided another process for isomerizing lower polymers of butadiene and copolymers of butadiene with other monomers to convert their non-conjugated double bonds into conjugated double bonds, which comprises adding such diamine compounds as shown by the above general formula to the reaction system, normally prior to the inactivation of the catalyst subsequent to the polymerization reaction, regardless of the presence or without the presence of any monomers and performing the isomerization reaction at a temperature of 0° C. to 200° C., or preferably at a temperature of 30° C. to 150° C.

In other words, this invention is characterized in that isomerized butadiene lower polymers can be made economically and at a low production cost by treating the polymer with a combination of organic alkali metal compounds or alkali metal dispersions, which are catalysts for lower polymerization and copolymerization of butadiene, with diamine compounds, and by effectively making use of the polymerization catalyst both for the polymerization reaction and isomerization reaction.

When alkali metal dispersions are employed as a polymerization catalyst and when the polymerization reaction is initiated and propagated, it seems that the alkali metal takes the form of an organic alkali metal. Consequently, even if an alkali metal dispersion is used as the polymerization catalyst, the subsequent isomerization reaction gives the same results as when an organic alkali metal is employed as the same.

DETAILED DESCRIPTION OF THE INVENTION

Conjugated diene-containing lower polymers and copolymers of butadiene prepared according to the process of this invention are light color compounds having a high reactivity, and they are effectively used as quick-dry paint vehicles, molded articles and intermediates for various synthetic reactions.

As a lower polymer or copolymer of butadiene, there can be employed polymers prepared according to conventional methods, such as polymers containing 1,2-double bonds in a large amount, polymers containing 1,4-double bonds in a large amount and polymers containing both 1,2-double bonds and 1,4-double bonds.

Namely, a lower polymer of butadiene or a lower copolymer of butadiene with other monomer obtained by a method comprising polymerizing butadiene alone or butadiene with other monomer in the presence of an alkali metal or organic alkali metal compound as a catalyst is a typical instance of the lower polymer to be used in this invention. In this case, in order to control the molecular weight and obtain a light color polymer of a less gel content effectively, there are typically adopted a living polymerization method using a tetrahydrofuran solvent and a chain transfer polymerization method in which an ether such as dioxane or an alcohol such as isopropyl alcohol is added to the polymerization system and an aromatic hydrocarbon such as toluene and xylene is employed as a chain transfer agent or a solvent. Lower polymers obtained by these polymerization methods can be effectively used in this invention. Furthermore, lower polymers rich in 1,4-double bonds in the butadiene units, which are prepared by polymerizing butadiene or copolymerizing it with other monomer in the presence of a catalyst comprising a compound of a metal belonging to Group VIII of the Periodic Table and an alkyl aluminum halogenide, can be similarly employed.

Lower copolymers referred to in the instant specification and claims include copolymers of butadiene with other conjugated diolefin such as isoprene, 2,3-dimethylbutadiene and piperylene, and copolymers of butadiene with a vinyl-substituted aromatic compound such as styrene, α-methylstyrene, vinyl toluene and divinylbenzene. When such lower copolymer of butadiene is employed, it is preferred that the content of the comonomer units does not exceed 50 mole %.

It is desired that the lower polymer or copolymer of butadiene to be used in this invention is liquid or semisolid at room temperature and it has a molecular weight of 300 to 10,000.

In this invention, either the 1,2-double bond or the 1,4-double bond in the butadiene units can be isomerized to the conjugated diene bond.

The catalyst to be used in this invention comprises (1) an organic alkali metal compound and (2) a diamine compound.

The organic alkali metal compound to be used as component (1) is a compound represented by the following general formula R—Me wherein Me is an alkali metal from the group consisting of lithium, sodium and potassium and R stands for an alkyl group such as methyl, ethyl, propyl, butyl and pentyl groups, an alkenyl group such as allyl and methallyl groups, a cycloalkyl group such as cyclopentyl and cyclohexyl groups, or an aryl or aralkyl group such as phenyl and benzyl groups of 1-20 carbon atoms preferably.

Further, complexes of an aromatic polynuclear compound such as naphthalene and anthracene with sodium or potassium can be used as the component (1). The foregoing compounds can be used singly or in the form of admixtures of two or more of them.

The diamine compound to be used as the component (2) of the catalyst of this inventon is a compound represented by the following general formula

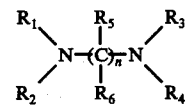

wherein n is an integer of 2 or 3, and $R_1$, $R_2$, $R_3$, $R_4$, $R_5$ and $R_6$ stand for a hydrogen atom or an organic compound residual group having 1 to 20 carbon atoms and optionally two members of $R_1$, $R_2$, $R_3$ and $R_4$ may be bonded together to form a cyclic structure.

Preferable examples of members $R_1$ to $R_6$ are hydrogen, hydrocarbon residual groups such as alkyl, cycloalkyl and aryl groups, and nitrogen-containing organic residual groups including primary, secondary or tertiary amino groups. When the above diamine compound contains such a functional group as a carboxyl, hydroxyl or thiol group, the effect of the organic alkali metal compound as the component (1) is reduced by the presence of such functional group.

Typical instances of such diamine compounds are ethylene diamines and propylene diamines such as ethylene diamine, tetramethylethylene diamine, tetraethylethylene diamine, propylene diamine, dimethylpropylene diamine and tetramethylpropylene diamine; polyethylene polyamines expressed by the following general formula

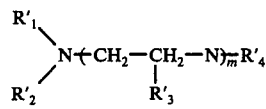

wherein m is an integer of at least 2, and $R'_1$, $R'_2$ $R'_3$ and $R'_4$ stand for a hydrogen atom or a hydrocarbon residue having 1-20 carbon atoms.
such as diethylene triamine, pentamethyldiethylene triamine and hexamethyltriethylene tetramine; and cyclic diamines such as piperidine and triethylene diamine.

When an organic alkali metal compound is reacted with such diamine compound, a violent change in the hue is caused to occur, and the organic alkali metal compound insoluble in hydrocarbons is solubilized by this reaction. Thus, it is suggested that a complex in which the —N—C—C—N— or —N—C—C—C—N— group acts effectively is formed.

The amount of the diamine compound to be combined with the organic alkali metal compound is not particularly critical, but it is preferred that the diamine compound is added in an amount of 0.1 to 100 mole equivalents to the organic alkali metal compound (0.1 to 100 moles of the —N—C—C—N— or —N—C—C—C—N— unit of the diamine per mole of the organic alkali metal compound). Especially high isomerizing effects can be obtained when the diamine compound is used in an amount of 0.5 to 10 mole equivalents to the organic alkali metal compound.

In case the amount of the diamine compound is too small, formation of a complex having an isomerizing activity is inhibited, and in contrast, if the amount of the diamine compound used is too large, any prominent increase of the catalytic activity is not obtained, resulting in economical disadvantages.

In this invention, the amount used of the organic alkali metal compound is not particularly critical, but it is preferred that the organic alkali metal compound is used in an amount of 1 millimole to 1 mole, especially 10 millimoles to 100 millimoles, per 100 g of the polymer.

The isomerization using the catalyst of this invention may be conducted in the absence of a solvent when the viscosity of the polymer is low, but when the viscosity of the polymer is high, it is preferred that a solvent capable of dissolving the starting polymer and giving no bad influence to the isomerization reaction, such as aliphatic hydrocarbons and aromatic hydrocarbons, is employed.

The isomerization using the catalyst of this invention is conducted at 0° to 200° C., preferably 30° to 150° C.

There are no restrictions to the isomerization reaction according to this invention, so far as it is performed substantially in a solvent. It is, however, preferable to employ a solvent which does not affect adversely but dissolves the polymer. For example, aliphatic or aromatic hydrocarbons are preferable.

This invention is now illustrated more detailedly by reference to Examples.

EXAMPLE 1

100 g of a polybutadiene having a molecular weight of 1000, a 1,2-double bond content of 86% and a trans-double bond content of 14% was dissolved in 50 cc of benzene, and 20 millimoles of benzylsodium and 40 millimoles of tetramethylethylene diamine were added to the solution. The mixture was reacted in a nitrogen current at 60° C. for 3 hours. 6cc of methanol was added to the reaction mixture to deactivate the catalyst, and the reaction mixture was treated with activated clay and filtered to remove the sodium compound. Then, the solvent and remaining diamine were distilled off under reduced pressure to obtain a light color polymer free of the alkali metal.

The diene value of the resulting polymer was 23.0. When a composition comprising 100 parts by weight of the so formed polymer and 1 part by weight of cobalt naphthenate (in the form of 6% solution) was coated in a thickness of 30μ and dried at room temperature, the tack free state was obtained in 4 hours and it took 8 hours to complete the curing.

The starting polybutadiene having a diene value of 0.3 was incorporated with 1 part by weight, per 100 parts by weight of the polymer, of cobalt naphthenate (in the form of 6% solution) and the resulting composition was coated in a thickness of 30μ. When the coating was dried at room temperature, the tack free state was obtained in 25 hours, and it took 50 hours to complete the curing. In view of the foregoing test results, it will readily be understood that the reactivity of the starting polybutadiene was highly improved by the isomerization conducted according to this invention.

EXAMPLES 2 TO 6 AND COMPARATIVE EXAMPLES 1 TO 4

100 g of a polybutadiene having a molecular weight of 1100, a 1,2-double bond content of 89% and a trans-double bond content of 11% was dissolved in 100 cc of toluene, and 20 millimoles of benzyl sodium and a tertiary amine indicated in Table 1 were added to the solution. The resulting mixture was reacted in a nitrogen current at 80° C for 3 hours, and the post treatments were conducted in the same manner as described in Example 1 to obtain results shown in Table 1.

Table 1

| | Complexing Agent | | Properties of Polymer | | | Coating Drying rate at Room Temperature (hr) | |
|---|---|---|---|---|---|---|---|
| | Kind | Amount (m.mole) | Trans* Content(%) | Vinyl* Content(%) | Diene Value | Tack Free | Complete Curing |
| Comparative Example 1 | starting polymer | — | 9 | 74 | 0.8 | 25 | 50 |
| Example 2 | 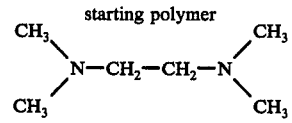 | 40 | 11 | 54 | 18 | 4 | 9 |

Table 1-continued

| | Complexing Agent | | Properties of Polymer | | | Coating Drying rate at Room Temperature (hr) | |
|---|---|---|---|---|---|---|---|
| | Kind | Amount (m.mole) | Trans* Content(%) | Vinyl* Content(%) | Diene Value | Tack Free | Complete Curing |
| Example 3 | $C_2H_5\!\!\diagdown\!\!N\!-\!CH_2\!-\!CH_2\!-\!N\!\!\diagup\!\!C_2H_5$ (with $C_2H_5$ groups) | 40 | 11 | 56 | 16 | 5 | 10 |
| Example 4 | $CH_3,C_2H_5\!\!\diagdown\!\!N\!-\!CH_2\!-\!CH\!-\!N\!\!\diagup\!\!CH_3,CH_3$ (with $CH_3$ branch) | 40 | 10 | 59 | 14 | 6 | 12 |
| Example 5 | $CH_3\!\!\diagdown\!\!N\!-\!CH_2CH_2\!-\!N\!-\!CH_2CH_2\!-\!N\!\!\diagup\!\!CH_3$ (with $CH_3$ groups) | 40 | 12 | 50 | 21 | 3 | 7 |
| Example 6 | $\begin{array}{c}CH_2CH_2\\N\!-\!CH_2CH_2\!-\!N\\CH_2CH_2\end{array}$ | 40 | 10 | 58 | 14 | 6 | 12 |
| Comparative Example 2 | not added | 0 | 9 | 71 | 0.8 | 25 | 50 |
| Comparative Example 3 | $NEt_3$ | 40 | 9 | 74 | 1.0 | 24 | 50 |
| Comparative Example 4 | pyridine | 40 | 9 | 73 | 0.9 | 25 | 50 |

*The double bond content was determined by infrared spectrophotometry with use of the extinction coefficient of Morero.
It is considered that the reason why the sum of the trans and vinyl contents is not 100 % is that the terminal double bonds are not calculated and some of double bonds are lost by cyclization.

As is apparent from the results shown in Table 1, according to the process of this invention the conjugated diene units are formed at a very high conversion and a useful product can be obtained, whereas a monofunctional tertiary amine such as triethyl amine and pyridine does not cause the isomerization of the polymer. This is considered to be due to the fact that such amine does not form a complex with benzylsodium.

EXAMPLES 7 AND 8 AND COMPARATIVE EXAMPLES 5 TO 7

A polybutadiene having a molecular weight of 1000 was dissolved in 100 cc of benzene, and 20 millimoles of phenylsodium and an amine indicated in Table 2 given below were added to the solution. The reaction was carried out in the same manner as in Example 2 to obtain results shown in Table 2.

amine is employed, if it is a mono-amine, no isomerizing activity is obtained. Further, in the case of a diamine having no complex-forming property such as hexamethylene diamine or p-phenylene diamine, the isomerization is not allowed to advance.

EXAMPLE 9

800 g of a butadiene copolymer having a molecular weight of 1350, a 1,2-double bond content of 89%, a transdouble bond content of 11% and a styrene content of 10 mole % was dissolved in 2200 parts of benzene, and 200 millimoles of benzylsodium and 900 millimoles of ethylene diamine were added to the solution. The mixture was reacted in a nitrogen current at 70° C. for 8 hours, and the resulting reaction liquor was washed with water until no alkali metal was detected in the washing liquor. Benzene was removed from the reaction product by distillation to obtain an isomerized butadiene copolymer.

Table 2

| | Complexing Agent | | Properties of Polymer | | | Coating Drying Rate at Room Temperature (hr) | |
|---|---|---|---|---|---|---|---|
| | Kind | Amount (m.mole) | Trans Content(%) | Vinyl Content(%) | Diene Value | Tack Free | Complete Curing |
| Comparative Example 1 | starting polymer | — | 9 | 74 | 0.8 | 25 | 50 |
| Example 7 | $H_2N\!-\!CH_2\!-\!CH_2\!-\!NH_2$ | 40 | 10 | 56 | 15 | 6 | 12 |
| Example 8 | $H_2N\!-\!CH_2\!-\!CH_2\!-\!NH\!-\!CH_2\!-\!CH_2\!-\!NH_2$ | 30 | 10 | 57 | 14 | 7 | 13 |
| Comparative Example 5 | $NEt_2H$ | 40 | 9 | 74 | 1.5 | 24 | 50 |
| Comparative Example 6 | $H_2N\!-\!(CH_2)_6\!-\!NH_2$ | 40 | 10 | 75 | 1.0 | 25 | 50 |
| Comparative Example 7 | $H_2N\!-\!\!\bigcirc\!\!-\!NH_2$ (p-phenylene diamine) | 40 | 10 | 75 | 0.9 | 25 | 50 |

As is apparent from the results shown in Table 2, when the diamine compound specified in this invention is employed, the isomerization is allowed to proceed very effectively. Even when a primary or secondary The so obtained copolymer had a molecular weight of 1370, a Gardner color number of 5 and a diene value of 19. When a composition of 100 parts by weight of the so obtained copolymer and 1 part by weight of cobalt naphthenate (in the form of 6% solution) was coated in a thickness of 30μ and was dried at room temperature, the tack free state was attained in 4 hours and it took 8 hours to complete the curing.

EXAMPLE 10

100 g of a cis-polybutadiene having a molecular weight of 1750, a cis-double bond content of 75%, a trans-double bond content of 19% and a 1,2-double bond content of 6% was dissolved in 100 cc of toluene, and 20 millimoles of benzylsodium and 40 millimoles of tetramethylethylene diamine were added to the solution. The mixture was reacted at 70° C. for 3 hours in a nitrogen current. Methanol was added to the reaction mixture to deactivate the catalyst and then, the reaction mixture was incorporated with 20 g of activated clay and stirred violently. Then, the mixture was filtered, and the solvent and remaining tetramethylethylene diamine were distilled off.

The resulting polymer had a molecular weight of 1800 and the diene value of the polymer was 32. As a result of the infrared absorption spectrum analysis, it was found that the polymer and a cis-double bond content of 53%, a trans-double bond content of 12% and vinyl double bond content of 7%.

From the results of this example, it will readily be understood that also the 1,4-double bond is isomerized according to the process of this invention.

EXAMPLE 11 TO 13 AND COMPARATIVE EXAMPLE 8 TO 11

100 g of a polybutadiene having a molecular weight of 750, a 1,2-double bond content of 85% and a trans-double bond content of 15% was dissolved in 200 cc of benzene, and 40 millimoles of tetramethylethylene diamine and 20 millimoles of an organic alkali metal compound indicated in Table 3 given below were added to the solution. The mixture was reacted at 50° C. for 5 hours. Results of the analysis of the resulting polymer are shown in Table 3, and results obtained without addition of tetramethylethylene diamine are also shown in Table 3 as results of Comparative Examples.

Table 3

|  | Organic Alkali Metal Compound | Tetramethyl-ethylene Diamine | Diene Value |
|---|---|---|---|
| Comparative Example 8 | (starting polymer) | — | 0.1 |
| Comparative Example 9 | butyl-lithium | not added | 1.5 |
| Example 11 | ditto | added | 15 |
| Comparative Example 10 | amylsodium | not added | 0.8 |
| Example 12 | ditto | added | 14 |
| Comparative Example 11 | phenylpotassium | not added | 1.0 |
| Example 13 | ditto | added | 18 |

The results shown in Table 3, as well as the results obtained in the foregoing Examples, indicate that the process of this invention is very effective for isomerizing non-conjugated double bonds to conjugated double bonds in butadiene polymers.

EXAMPLE 14

In a 2 lit. capacity autoclave of stainless steel, 1,000 cc of benzene as a solvent, 50 cc of toluene as a chain transfer agent and 100 millimoles of benzylsodium were taken, and subsequently 500 cc of butadiene was charged therein. The reaction was carried out at 30° C. for 2.5 hr in the way that almost all of the butadiene substantially entered into the reaction. After the completion of the reaction, a part of the reaction liquid was taken out in an amount of 100 cc. Then, 200 millimoles of tetramethylethylene-diamine was added to the remaining reaction liquid. The reaction liquid thus obtained was subjected to isomerization reaction at 70° C. for 8 hr. After the inactivation of the catalyst by adding 60 cc of methanol to the reaction liquid, it was treated with 100 g of activated clay and was filtered to remove sodium compounds. The filtrate thus obtained was distilled under vacuum to evaporate the solvent and remaining amine thereby to produce a pale color polymer without containing any amount of sodium. And the polymer was obtained in an amount of 300 g.

The polymer had a molecular weight of 1,000, a diene value of 19, 1,2-double bond content of 55% and a trans-1,4-double bond content of 12%. A composition comprising 1 part of the polymer and 100 parts of cobalt naphthenate (in the form of 6% solution) was coated in a thickness of 30μ to examine the drying speed at ambient temperature. The result was as shown below;

Set to touch 4.5 hr
Full hardness 9 hr.

As a comparison, the reaction liquid taken before the addition of diamine was operated in the same manner without adding the diamine. The polymer in a pale color thus prepared had a molecular weight of 950, a 1,2-double bond content of 78%, a trans-1,4-double bond content of 12% and diene value of only 0.2. A coating composition was prepared by adding 1 part of cobalt naphthenate (in a 6% solution) to 100 parts of the polymer to examine the drying speed of the coated film at ordinary temperature. The drying speed of the coated film 30μ in thickness was as shown below;

Set to touch 25 hr
Full hardness 50 hr.

From the above result, it is clearly seen that a butadiene lower polymer formed from the polymerization of butadiene is converted into an isomerized butadiene lower polymer by a joint function of the polymerization catalyst and amine compounds owing to the addition of amine compounds, and that the reactivity of the isomerized polymer is greatly increased by the isomerization.

EXAMPLES 15 TO 21 AND COMPARATIVE EXAMPLES 12 TO 16

In the same way as in Example 14, the polymerization reaction was conducted by using 100 millimoles of benzylsodium, followed by the various amine compounds, and subsequently an isomerization reaction was conducted at 80° C. for 3 hr. The results were summarized in Table 4.

Table 4

| Nos. of Example and Comparative Example | Amine Compound Structural Formula | Amount (milli mole) | Property of Polymer | | | Drying Speed of Coated Film at Ordinary Temp. | |
|---|---|---|---|---|---|---|---|
| | | | Trans* Content (%) | Vinyl* Content (%) | Diene Value | Set to Touch (hr) | Full Hardness (hr) |
| 15 | CH₃\N—CH₂—CH₂—N/CH₃ (with CH₃ groups) | 300 | 11 | 50 | 21 | 3 | 7 |
| 16 | C₂H₅\N—CH₂—CH₂—N/C₂H₅ (with C₂H₅ groups) | 200 | 13 | 53 | 18 | 4.5 | 9 |
| 17 | CH₃\N—CH₂—CH—N/CH₃ (with CH₃ groups and CH₃ branch) | 210 | 12 | 58 | 14 | 6 | 12 |
| 18 | CH₃\N—CH₂—CH₂—N—CH₂—CH₂—N/CH₃ (with CH₃ groups) | 200 | 12 | 56 | 16 | 5 | 10 |
| 19 | H₂N—CH₂—CH₂—NH₂ | 200 | 11 | 52 | 20 | 4 | 8 |
| 20 | H₂N—CH₂—CH₂—NH—CH₂—CH₂—NH₂ | 200 | 11 | 59 | 12 | 7 | 13 |
| 21 | N(CH₂—CH₂)₂N(CH₂—CH₂) (piperazine-like) | 400 | 12 | 60 | 11 | 8 | 4 |
| 12⁺ | NEt₃ | 400 | 12 | 74 | 0.5 | 25 | 50 |
| 13⁺ | NEt₂H | 400 | 11 | 74 | 0.6 | 25 | 50 |
| 14⁺ | H₂N(CH₂)₆NH₂ | 400 | 13 | 75 | 1.0 | 24 | 48 |
| 15⁺ | pyridine | 400 | 13 | 74 | 0.7 | 24 | 49 |
| 16⁺ | — | 0 | 12 | 75 | 0.2 | 25 | 30 |

*Double bond content was determined by infrared spectrophotometry by making use of the extinction coefficient by Morero.

EXAMPLE 22

A bulk of 400 cc of tetrahydrofuran was put in a stainless steel autoclave of 2 lit. capacity, and 2 g of o-terphenyl was dissolved therein. After purging the inside of the system with nitrogen gas, a mixture solution containing o-terphenylsodium complex was prepared by adding thereto a dispersion containing 23 g of metallic sodium with an average particle diameter of 8μ in the form of a metallic sodium concentration of 50% which was made by using kerosene as a dispersion medium. The mixture solution was cooled to −70° C., and 1,000 cc of a liquid butadiene was supplied therein over 4 hr while maintaining at the temperature and while stirring. After a pre-determined amount of the butadiene was added, the polymerization reaction mixture solution was heated to ambient temperature to purge off the unreacted butadiene. A part of the reaction solution was taken out in an amount of 100 cc at the temperature. 116 g of tetramethylethylene diamine was added to the remaining solution, and the solution thus formed was heated to 70° C. and was maintained at the temperature for 5 hr. To the heated solution was added 50 cc of methanol to inactivate the catalyst, and subsequently was treated with 100 g of activated clay to eliminate sodium compounds. After distilling off methanol, tetrahydrofuran and amine compounds under vacuum, there was obtained a polymer in a pale color. The polymer had a molecular weight of 1,800, a diene value of 18, a 1,2-double bond content of 55% and a trans-1,4-double bond content of 10%.

On the other hand, the reaction solution which was sampled before the addition of the amine compound was processed in the same manner as described above. The polymer thus prepared had a molecular weight of 1,900, a diene value of 0.4, a 1,2-double bond content of 90% and a trans-1,4-double bond content of 10%.

EXAMPLE 23

After fully purging the inside of the system with nitrogen gas, 1,500 cc of toluene was put in a stainless autoclave of 2 lit. capacity. Then, a dispersion containing 2.3g of metallic sodium particles with an average particle diameter of 9.5μ, which was prepared in a sodium concentration of 20% by using toluene as a dispersion medium, and 4.4 g of dioxane were added thereto. After 1 hr of the feed of 180 cc of butadiene at 80° C., an additional 700 cc of butadiene was fed in a constant rate over 90 hr. After the supply of butadiene in a pre-determined amount, the reaction solution was kept standing for 10 min., and the unreacted butadiene was purged out of the system. A part of the reaction solution was sampled in an amount of 100 cc., and 46.4 g of tetramethylethylenediamine was added to the remaining solution to further an isomerization reaction. After the isomerization reaction was carried out at 80° C. for 5 hr, 60 cc of methanol was added thereto to inactivate the catalyst, and sodium compounds were separated with 100g of activated clay. The filtrate thus formed was subjected to a vacuum distillation to distill off toluene, methanol, dioxane and tetramethylethylenediamine, and a resultant polymer was pale and viscous.

The polymer had a molecular weight of 1,500, a diene value of 21, a 1,2-double bond content of 51% and a trans-1,4-double bond content of 8%.

As a comparison, the reaction solution which was sampled before the addition of the diamine compound was processed in the same manner as operated above. The polymer thus formed had a molecular weight of 1,500, a diene value of 0.3, a 1,2-double bond content of 78% and a trans-1,4-double bond content of 13%.

EXAMPLE 24

The inside of the system with a 2 lit. capacity autoclave of stainless steel was fully purged with nitrogen gas and 985 cc of toluene, 13 cc of tetrahydrofuran, 135 cc of styrene, 900 cc of butadiene and 10 cc of a butyl lithium solution were put in the autoclave. The mixture solution thus formed was reacted at 70° C. for 3 hr. After sampling of a part of the reaction mixture solution in an amount of 100 cc, 25 g of ethylenediamine was added to the remaining solution to perform a further isomerization reaction. The isomerization reaction was carried out for another 6 hr at the temperature. And after the completion of the reaction, 40 cc of methanol was added thereto to inactivate the catalyst, followed by washing with water. The washing was repeated until the solution was not alkaline. By distilling off the solvents, there was obtained a butadiene-styrene copolymer in a pale color.

The lower copolymer had a molecular weight of 1,800, a diene value of 19, a combined styrene content of 10%, a 1,2-double bond content of 54% and a trans-1,4-double bond content of 10%. A coating composition was prepared by adding 1 part of cobalt naphthenate (in a 6% solution) to 100 parts of the copolymer. The coated film 30μ thick had a drying speed at ordinary temperature as below;

Set to touch 4 hr
Full hardness 8 hr.

In contrast with this, a copolymer, which was prepared by operating in the same way as above the reaction solution taken out before the addition of the diamine compound, had a molecular weight of 1,780, a diene value of 0.4, a combined styrene content of 10%, a 1,2-double bond content of 78%, a trans-1,4-double bond content of 10%.

Another coating composition was prepared by mixing 100 parts of the copolymer and 1 part of cobalt naphthenate (in a 6% solution) to test a drying speed at ordinary temperature of its coated film in a thickness of 30μ. The test result was as shown below;

Set to touch 24 hr
Full hardness 50 hr.

What is claimed is:

1. A process for obtaining an isomer having conjugated double bonds of (A) a lower polymer of butadiene or (B) a lower copolymer of butadiene with at least one monomer selected from the group consisting of a conjugated diolefin other than butadiene and a vinyl-substituted aromatic compound, each of (A) and (B) being liquid or semi-solid at room temperature, having a molecular weight of from 300 to 10,000 and having non-conjugated double bonds therein, which comprises contacting a charge consisting essentially of said lower polymer (A) or copolymer (B) at from 0° to 200° C. in the presence of a catalyst comprising (1) an organic alkali metal compound and (2) a diamine compound represented by the formula

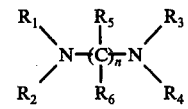

wherein $n$ is an integer of 2 or 3, and each of $R_1$, $R_2$, $R_3$, $R_4$, $R_5$ and $R_6$ represents a hydrogen atom or an organic compound residual group having from 1 to 20 carbon atoms and any two members of $R_1$, $R_2$, $R_3$ and $R_4$ may be bonded together to form a cyclic structure,
thereby forming a reaction product containing said isomer, and
recovering from said reaction product a product consisting essentially of said isomer.

2. A process of claim 1 wherein the lower copolymer (B) of butadiene is a lower copolymer of butadiene with a comonomer selected from the group consisting of isoprene, 2,3-dimethylbutadiene, piperylene, styrene, α-methylstyrene, vinyl toluene and divinylbenzene, the comonomer content thereof being up to 50 mole percent.

3. The process of claim 1, wherein the reaction is carried out in an aliphatic hydrocarbon solvent or an aromatic hydrocarbon solvent.

4. The process of claim 1, wherein the organic alkali metal compound (1) has the formula R—Me wherein Me is lithium, sodium or potassium, and R is selected from the group consisting of an alkyl, alkenyl, cycloalkyl, aryl and alkaryl group having from 1 to 20 carbon atoms.

5. The process of claim 1, wherein the organic alkali metal compound (1) is a complex of naphthalene or anthracene with sodium or potassium.

6. The process of claim 1, wherein the diamine compound is a diamine selected from the group consisting of ethylene diamine, tetramethylethylene diamine, tetraethylethylene diamine, propylene diamine, dimethylpropylene diamine and tetramethylpropylene diamine.

7. The process of claim 1, wherein the diamine compound (2) is a cyclic diamine selected from piperidine or triethyl diamine.

8. The process of claim 1, wherein the organic alkali metal compound (1) is used in an amount of from 1 millimole to 1 mole per 100 grams of the butadiene polymer.

9. The process of claim 1, wherein the organic alkali metal compound (1) is used in an amount of from 10 to 100 millimoles per 100 grams of the butadiene polymer.

10. The process of claim 1, wherein the diamine compound (2) is used in an amount of from 0.1 to 100 mole equivalents of the organic alkali metal compound (1).

11. The process of claim 1, wherein the diamine compound (2) is used in an amount of from 0.5 to 10 mole equivalents of the organic alkali metal compound (1).

12. The process of claim 1, wherein said isomer is free of said alkali metal.

13. The process of claim 1, wherein the catalyst is deactivated and removed before removing said isomer from the reaction product.

* * * * *

UNITED STATES PATENT AND TRADEMARK OFFICE
CERTIFICATE OF CORRECTION

PATENT NO. : 4,085,263
DATED : April 18, 1978
INVENTOR(S) : YUTAKA OTSUKI et al

It is certified that error appears in the above-identified patent and that said Letters Patent are hereby corrected as shown below:

Title page, at "[75]": replace "Hideo Horji" with
---Hideo Horii---.

Column 2, line 45: before "gelation", replace "of" with ---or---.

Column 2, line 64: replace "polynmer" with
---polymer---.

Column 6, line 7: replace "bowever" with ---however---.

Signed and Sealed this

Twenty-eighth Day of November 1978

[SEAL]

Attest:

RUTH C. MASON
Attesting Officer

DONALD W. BANNER
Commissioner of Patents and Trademarks